(12) United States Patent
White (10) Patent No.: US 11,293,637 B2
(45) Date of Patent: Apr. 5, 2022

(54) COMBUSTOR LINER ATTACHMENT ASSEMBLY FOR GAS TURBINE ENGINE

(71) Applicant: United Technologies Corporation, Farmington, CT (US)

(72) Inventor: Kevin W. White, Jupiter, FL (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 298 days.

(21) Appl. No.: 16/189,730

(22) Filed: Nov. 13, 2018

(65) Prior Publication Data

US 2020/0116356 A1    Apr. 16, 2020

Related U.S. Application Data

(63) Continuation-in-part of application No. 16/160,321, filed on Oct. 15, 2018.

(51) Int. Cl.
| | |
|---|---|
| *F23R 3/60* | (2006.01) |
| *F23M 5/04* | (2006.01) |
| *F23R 3/00* | (2006.01) |
| *F02C 7/20* | (2006.01) |

(52) U.S. Cl.
CPC .............. *F23M 5/04* (2013.01); *F02C 7/20* (2013.01); *F23R 3/002* (2013.01); *F23R 3/60* (2013.01); *F05D 2230/60* (2013.01); *F05D 2260/30* (2013.01); *F05D 2260/31* (2013.01); *F23M 2900/05002* (2013.01); *F23R 2900/00005* (2013.01); *F23R 2900/00017* (2013.01)

(58) Field of Classification Search
CPC ..................................... F02C 7/20; F23R 3/60
See application file for complete search history.

(56) References Cited

U.S. PATENT DOCUMENTS

| | | | |
|---|---|---|---|
| 2,670,601 A | 3/1954 | Williams et al. | |
| 3,826,088 A * | 7/1974 | Nash ....................... | F02K 1/822 60/766 |
| 4,074,708 A | 2/1978 | Hochmuth | |

(Continued)

FOREIGN PATENT DOCUMENTS

| | | |
|---|---|---|
| DE | 3625056 A1 | 1/1988 |
| DE | 19730751 A1 | 1/1998 |

(Continued)

OTHER PUBLICATIONS

English Machine Translation to Abstract DE19730751.

(Continued)

*Primary Examiner* — Todd E Manahan
*Assistant Examiner* — Marc J Amar
(74) *Attorney, Agent, or Firm* — Cantor Colburn LLP (57) ABSTRACT

A combustor liner panel attachment assembly. The assembly includes a first liner extending from a first end to a second end, and circumferentially to partially define a combustion zone. The assembly also includes a second liner disposed circumferentially adjacent to the first liner. The assembly further includes a radial support having a shoulder in contact with a radially inner surface of each of the first liner and the second liner to radially retain the first liner and the second liner, the radial support allowing the first liner and the second liner to thermally grow axially.

17 Claims, 7 Drawing Sheets

(56) References Cited

U.S. PATENT DOCUMENTS

| | | | |
|---|---|---|---|
| 4,380,896 A | 4/1983 | Wiebe | |
| 4,848,089 A | 7/1989 | Cramer | |
| 4,944,151 A | 7/1990 | Hovnanian | |
| 5,291,733 A * | 3/1994 | Halila | F23R 3/60 60/752 |
| 6,041,590 A | 3/2000 | Hayton et al. | |
| 7,089,748 B2 * | 8/2006 | Tiemann | F23M 5/04 60/757 |
| 7,546,743 B2 | 6/2009 | Bulman et al. | |
| 8,739,547 B2 | 6/2014 | Jarmon et al. | |
| 9,309,833 B2 * | 4/2016 | Senofonte | F16B 21/02 |
| 10,551,067 B2 * | 2/2020 | Okita | F23R 3/002 |
| 2002/0184886 A1 * | 12/2002 | Calvez | F23R 3/60 60/796 |
| 2006/0228211 A1 * | 10/2006 | Vance | F01D 5/147 415/200 |
| 2006/0242965 A1 * | 11/2006 | Shi | F23R 3/60 60/796 |
| 2007/0180809 A1 * | 8/2007 | Bessagnet | F23R 3/60 60/39.01 |
| 2011/0123323 A1 | 5/2011 | Ruberte Sanchez et al. | |
| 2012/0328996 A1 | 12/2012 | Shi et al. | |
| 2014/0109593 A1 * | 4/2014 | Senofonte | F02K 1/822 60/796 |
| 2016/0186997 A1 * | 6/2016 | Sadil | F02C 7/24 60/772 |
| 2016/0201910 A1 * | 7/2016 | Chang | F23R 3/007 60/753 |
| 2016/0245518 A1 | 8/2016 | Drake | |
| 2017/0335703 A1 | 11/2017 | White et al. | |
| 2019/0195136 A1 | 6/2019 | White et al. | |
| 2020/0116360 A1 * | 4/2020 | White | F02C 3/14 |
| 2020/0158341 A1 * | 5/2020 | Bloom | F23R 3/60 |

FOREIGN PATENT DOCUMENTS

| | | | |
|---|---|---|---|
| EP | 1423052 A | 1/1976 | |
| EP | 1507117 A1 | 2/2005 | |
| EP | 1882885 A2 | 1/2008 | |
| EP | 2538140 A2 | 12/2012 | |
| EP | 2778532 A1 | 9/2014 | |
| EP | 3104079 A1 * | 12/2016 | F23M 5/085 |
| EP | 3104079 A1 | 12/2016 | |
| EP | 3115690 A1 | 1/2017 | |
| WO | 2015022222 A1 | 2/2015 | |
| WO | 201500500629 A1 | 4/2015 | |
| WO | 2015132728 A1 | 9/2015 | |

OTHER PUBLICATIONS

European Search Report for Application No. EP 19 20 3242.
European Search Report for Application No. EP 19 20 3398.
Non-Final Office Action for U.S. Appl. No. 16/160,321; dated Oct. 14, 2020.
EP Office Action for Application No. 19 203 242.3; dated Jan. 22, 2021.

* cited by examiner

COMBUSTOR LINER ATTACHMENT ASSEMBLY FOR GAS TURBINE ENGINE

CROSS-REFERENCE TO RELATED APPLICATION

This application is a continuation-in-part of U.S. patent application Ser. No. 16/160,321, filed on Oct. 15, 2018, the disclosure of which is incorporated herein by reference in its entirety.

BACKGROUND

Exemplary embodiments pertain to the art of gas turbine engines and, more particularly, to a combustor liner attachment assembly for gas turbine engines.

Gas turbine engines are generally known and, when used on an aircraft, typically include a fan delivering air into a bypass duct and a compressor section. Air from the compressor section is passed downstream into a combustion section where it is mixed with fuel and ignited. Products of this combustion pass downstream over turbine rotors driving the turbine rotors to rotate.

Some existing gas turbine engines utilize a metallic bulkhead within the combustion section. The metallic bulkhead is either made as a single integral unit, or assembled from multiple bulkhead panels. In order to combat high temperatures, engines have been designed using materials other than metal to create the combustor itself or using a liner made from an alternate material within the combustor and affixed to the combustor via fasteners. However, robustly and efficiently attaching some of the alternate material liners to the metal bulkhead presents engineering challenges. This is particularly true with ceramic matrix composite (CMC) liners, as the ceramic matrix cannot withstand the torqueing of traditional bolt/screw type fasteners. Additionally, radially retaining the liner panel, while allowing the liner panel to grow axially for thermal compliance, is challenging.

BRIEF DESCRIPTION

Disclosed is a combustor liner panel attachment assembly. The assembly includes a first liner extending from a first end to a second end, and circumferentially to partially define a combustion zone. The assembly also includes a second liner disposed circumferentially adjacent to the first liner. The assembly further includes a radial support having a shoulder in contact with a radially inner surface of each of the first liner and the second liner to radially retain the first liner and the second liner, the radial support allowing the first liner and the second liner to thermally grow axially.

In addition to one or more of the features described above, or as an alternative, further embodiments may include that the radial support is a T-head bolt.

In addition to one or more of the features described above, or as an alternative, further embodiments may include that the shoulder of the radial support is disposed in a recess defined by the first liner and the second liner.

In addition to one or more of the features described above, or as an alternative, further embodiments may include a spring element located adjacent to a portion of the first liner and operatively coupled to a stationary structure, the spring element having a recessed segment. The assembly also includes a protrusion feature extending radially outwardly from the first liner, the protrusion feature disposed within the recessed segment of the spring element to axially retain the first liner.

In addition to one or more of the features described above, or as an alternative, further embodiments may include that the spring element is operatively coupled to a bulkhead structure.

In addition to one or more of the features described above, or as an alternative, further embodiments may include that the spring element is formed of metal.

In addition to one or more of the features described above, or as an alternative, further embodiments may include that the spring element is a ship-lap panel.

In addition to one or more of the features described above, or as an alternative, further embodiments may include that at least a portion of the first liner is formed with a non-metallic material.

In addition to one or more of the features described above, or as an alternative, further embodiments may include that the non-metallic material is ceramic matrix composite (CMC).

In addition to one or more of the features described above, or as an alternative, further embodiments may include that the first liner is formed of single crystal panels.

In addition to one or more of the features described above, or as an alternative, further embodiments may include that a metal fastener extends through a portion of the first liner and through a portion of the spring element to secure the first liner and the spring element together with a metal nut.

In addition to one or more of the features described above, or as an alternative, further embodiments may include a metal spacer disposed within an aperture of the first liner.

Also disclosed is a method of assembling a combustor liner panel attachment assembly. The method includes sandwiching a portion of a first liner and a spring element together. The method also includes disposing a protrusion feature extending radially outwardly from the first liner within a recessed segment of the spring element to axially retain the first liner. The method further includes inserting a metal fastener through a portion of the first liner and the spring element. The method yet further includes securing the first liner and the spring element together with a nut threaded to the metal fastener. The method also includes radially retaining the first liner and a second liner with a single T-head bolt having a shoulder that overlaps the first liner and the second liner.

Further disclosed is a gas turbine engine including a compressor section, a combustor section, a turbine section, and a combustor liner panel attachment assembly. The combustor liner panel assembly includes a non-metallic first liner extending from a first end to a second end, and circumferentially to partially define a combustion zone. The combustor liner panel assembly also includes a spring element located adjacent to a portion of the non-metallic liner and operatively coupled to a stationary structure. The combustor liner panel assembly further includes one of the spring element and the non-metallic liner having a protrusion feature extending radially therefrom, the other of the spring element and the non-metallic liner having a receiving feature, the protrusion feature disposed within the receiving feature of the spring element to axially retain the non-metallic liner. The combustor liner panel assembly yet further includes a second liner disposed circumferentially adjacent to the first liner. The combustor liner panel assembly also includes a radial support having a shoulder in contact with a radially inner surface of each of the first liner and the second liner to radially retain the first liner and the second liner, the radial support allowing the first liner and the second liner to thermally grow axially.

In addition to one or more of the features described above, or as an alternative, further embodiments may include that the radial support is a T-head bolt.

In addition to one or more of the features described above, or as an alternative, further embodiments may include that the shoulder of the radial support is disposed in a recess defined by the first liner and the second liner.

In addition to one or more of the features described above, or as an alternative, further embodiments may include that the spring element is operatively coupled to a bulkhead structure.

In addition to one or more of the features described above, or as an alternative, further embodiments may include that the spring element is formed of metal.

In addition to one or more of the features described above, or as an alternative, further embodiments may include that the spring element is a ship-lap panel.

In addition to one or more of the features described above, or as an alternative, further embodiments may include that the non-metallic first liner is formed of ceramic matrix composite (CMC).

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
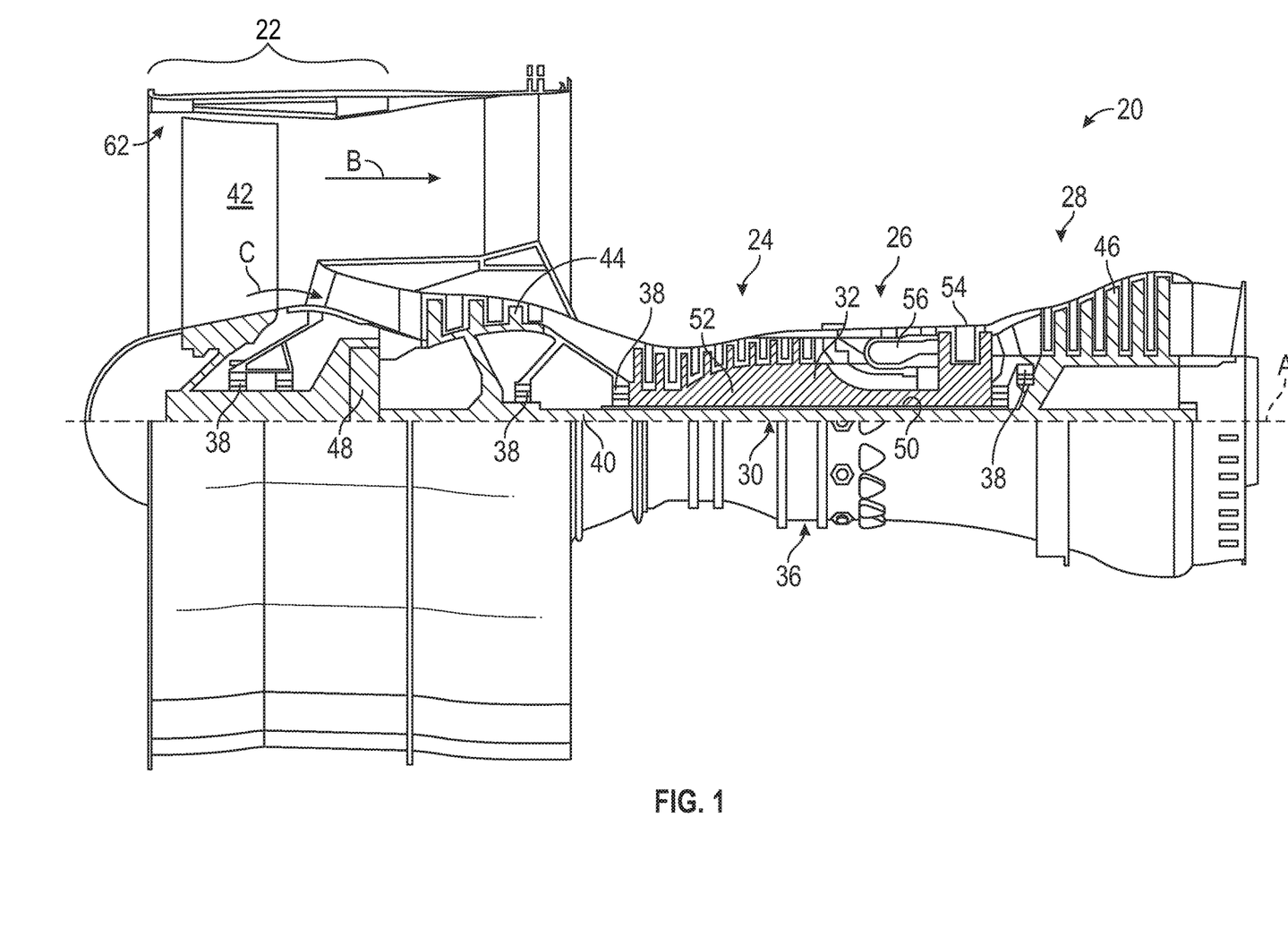
FIG. 1 is a side, partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 feet (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
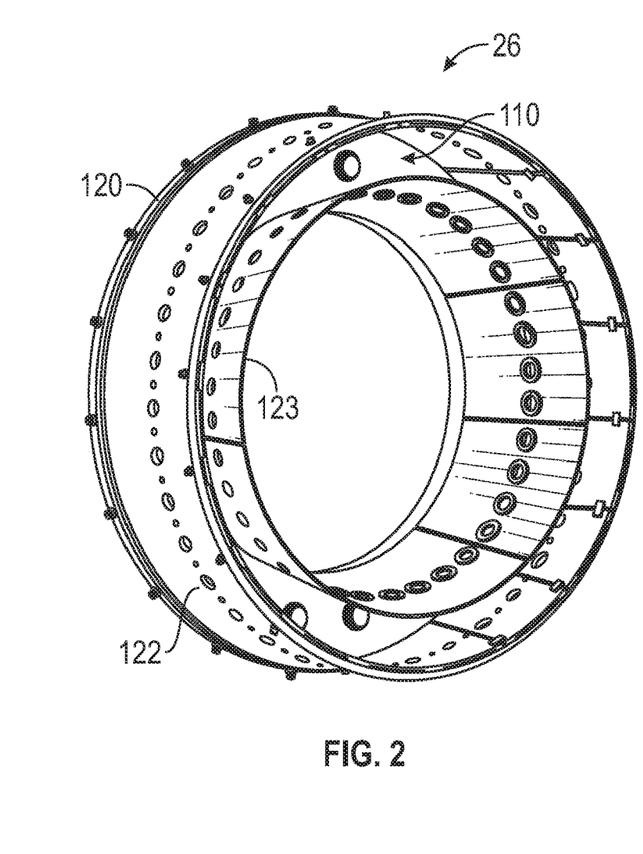
FIG. 2 is a perspective view of a portion of an annular combustor.

FIG. 2 illustrates a portion of the combustor section 26 in greater detail. The combustor section 26 includes a combustion region 110 in which fuel is combusted. The combustor section 26 is defined by a combustor bulkhead 120, an outer diameter combustor shell 122 and an inner diameter combustor shell 123 that are combined to form an annular combustor shape. The outer diameter combustor shell 122 and the inner diameter combustor shell 123 are each formed with a plurality of combustor panels that are connected to each other using known fastening techniques. The shells 122, 123 are full hoop sheet metal shells and are designed to handle a pressure load and other mechanical loads.

Figure 3:
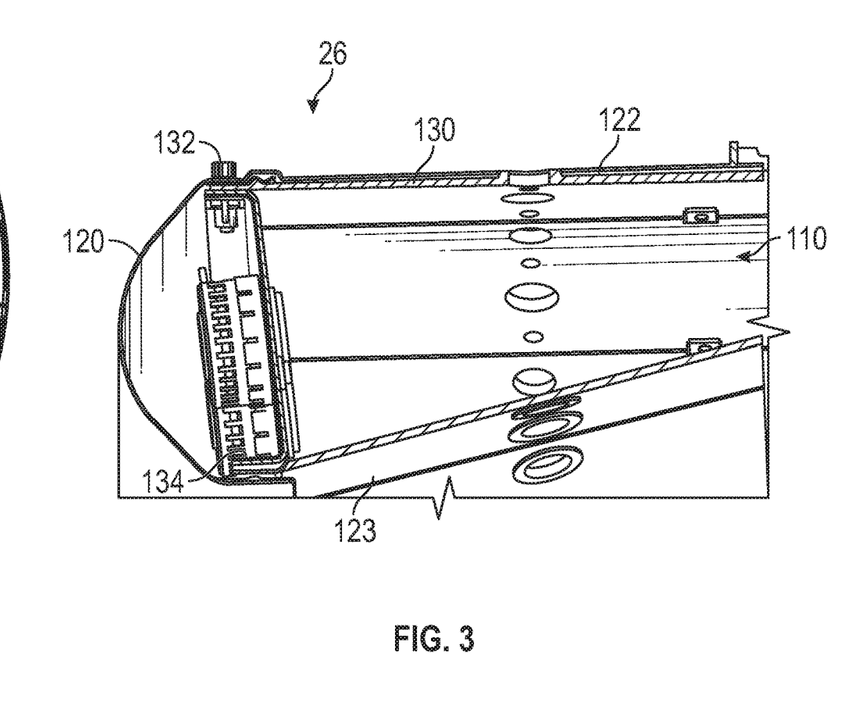
FIG. 3 is a side-elevational cross-sectional view of the annular combustor.

FIG. 3 illustrates a sectional view of a bulkhead portion of the combustor section 26 showing an inner lining of the combustion region 110 that is a liner structure 130 formed of multiple liner panels. The liner structure 130 is formed radially inward of the combustor shells 122, 123. The bulkhead 120 and the outer diameter combustor shell 122 are joined via a fastener 132. Similarly, the bulkhead 120 and the inner diameter combustor shell 123 are fastened together on an inner diameter edge via a fastener 134. While the illustrated annular combustor shows a single fastener on each edge, it is understood that multiple fasteners can be distributed around the annular combustor. The liner structure 130 may be a non-metallic material, such as a ceramic matrix composite (CMC) in some embodiments.

Figure 4:
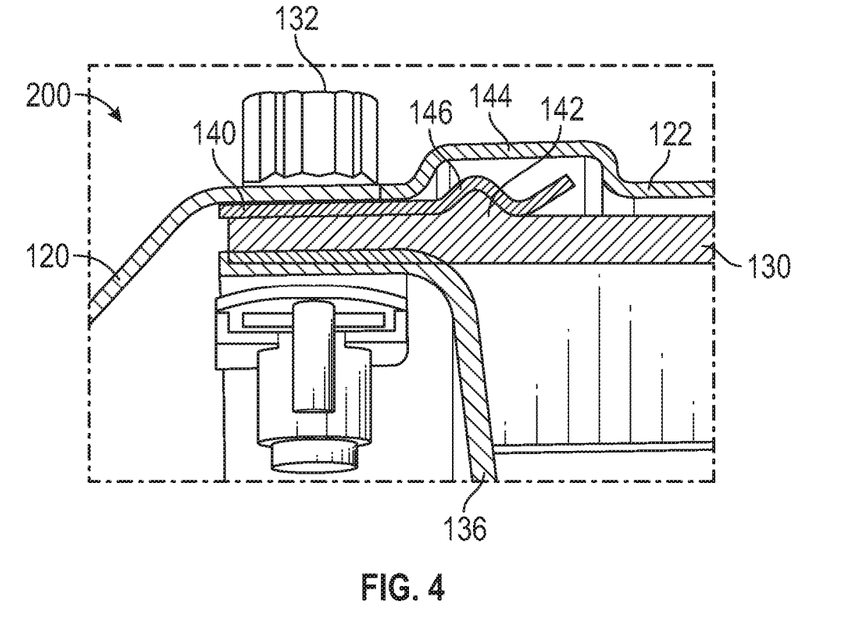
FIG. 4 is an enlarged portion of FIG. 3 illustrating a combustor liner attachment assembly.

FIG. 4 illustrates a liner attachment assembly 200. In the illustration of FIG. 4, the outer diameter combustor shell 122 and the liner structure associated therewith are illustrated. However, it is to be appreciated that the liner attachment assembly 200 may be employed to secure the inner diameter combustor shell 123 and the liner structure associated therewith. As such, the outer diameter structure is described herein.

As described above, the illustrated liner structure 130 is constructed of a ceramic matrix composite (CMC) material in some embodiments, and has a very high heat tolerance. CMC materials, however, have much lower coefficients of thermal expansion when compared to those of metals. As such, CMC materials are prone to breakage any place where a fault or stress is introduced into the material. By way of example, this type of fault or stress is introduced anywhere that a threaded component is threaded through the liner structure 130. Liner structures constructed of traditional materials, such as nickel alloys, are typically connected to the bulkhead panel via physical fasteners that use a threaded bolt/nut arrangement. As described above, passing the threaded bolt through the CMC material of the CMC liner structure 130 introduces a fault into the CMC material. This fault is exacerbated by thermal expansion and contraction and can lead to an early breakdown, such as cracking or delamination of the liner structure 130, resulting in more frequent repairs.

Each liner panel of the liner structure 130 is maintained in position due in part to an interference fit between portions of the combustor bulkhead 120, the liner structure 130, a bulkhead shell 136, and a spring element 140. Portions of each element are sandwiched together. The spring element 140 is a sheet metal spring element in some embodiments and may be referred to herein as such. A mechanical fastener, such as a bolt and nut arrangement extends through portions of each of the sandwiched elements, but is not threaded to the liner structure 130 to avoid the issues associated with the undesirable stress concentrations described in detail above.

Each liner panel of the liner structure 130 includes a protrusion feature 142 that extends radially outwardly. A hood 144 of the outer diameter combustor shell 122 accommodates the radially outward protrusion feature 142. The axial position of the liner structure 130 is maintained at the bulkhead end due to positioning of the protrusion feature 142 within a segment 146 of the sheet metal spring element 140. The segment 146 has a geometry that substantially corresponds to the geometry of the protrusion feature 142 of the liner structure 130 to ensure axial resistance at the contact location. In the illustrated embodiment, the segment 146 is a recessed portion that accommodates the protrusion feature 142. It is to be understood that the particular "bump" shape of the protrusion feature 142 is an example and that alternate shaped protrusion features can be used to the same effect. The spring element 140 is operatively coupled to the bulkhead 120. In operation, as the combustor section 26 heats substantially, the sheet metal spring element 140 is provided to trap the liner structure 130 on one end while allowing the other end to grow axially due to thermal growth.

Figure 9:
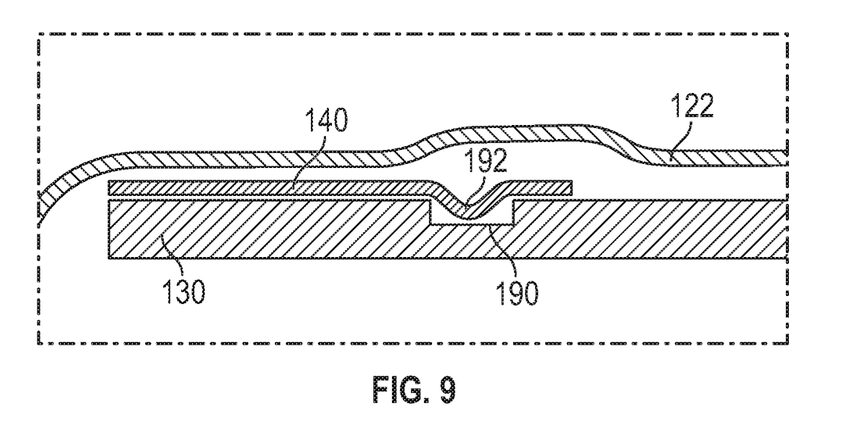
FIG. 9 is a sectional view of the combustor liner attachment assembly according to another aspect of the disclosure.
Figure 10:
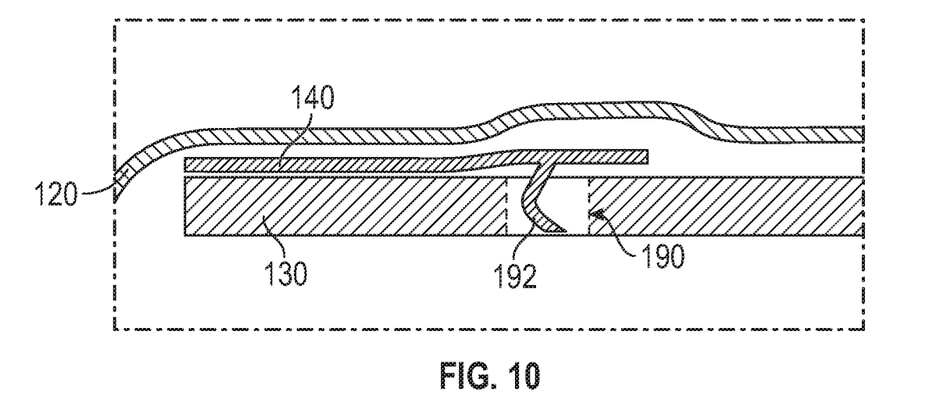
FIG. 10 is a sectional view of the combustor liner attachment assembly according to another aspect of the disclosure.

The above-described embodiment relates to an arrangement of the protrusion feature 142 being part of the liner structure 130 and the recess segment 146 being part of the spring element 140. However, in some embodiments, the reverse relationship is true. In particular, the liner structure 130 may define a segment 190 that receives a protrusion 192 extending radially inward from the spring element 140, as shown in the embodiments of FIGS. 9 and 10. FIG. 9 shows a segment 190 that is a recessed portion of the liner structure 130. Such a recessed portion may extend fully around the circumference of the liner structure 130 in some embodiments, but may be localized cutouts in other embodiments. FIG. 10 illustrates the segment 190 as a hole extending through the liner structure 130. In such an embodiment, the protrusion 192 extending from the spring element 140 is a compliant pin or the like that resiliently moves during relative axial movement between the liner structure 130 and the spring element 140.

It is to be appreciated that axial securement may be made at an opposite end of the liner structure 130 in some embodiments. In such embodiments, the spring element 140 may be operatively coupled to a compliant seal between the combustor section 26 and the turbine section 28. This may be particularly useful for liner structures formed of other non-metallic materials. Additionally, although described herein as being utilized with liners formed at least partially with a non-metallic material, it is to be understood that liners formed with other materials may benefit from the embodiments described herein. For example, full or partial metal liners may be used as the liner material. Furthermore, a single crystal liner may be employed.

Figure 5:
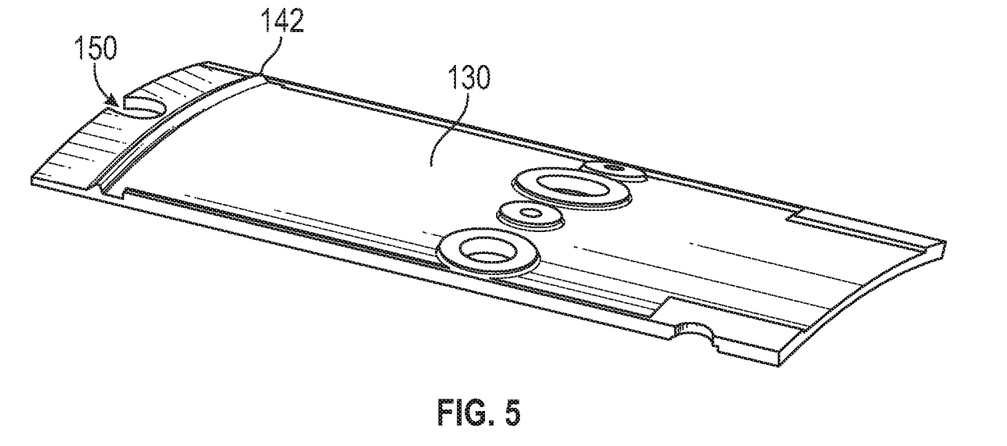
FIG. 5 is a perspective view of an outer diameter panel of the annular combustor.
Figure 6:
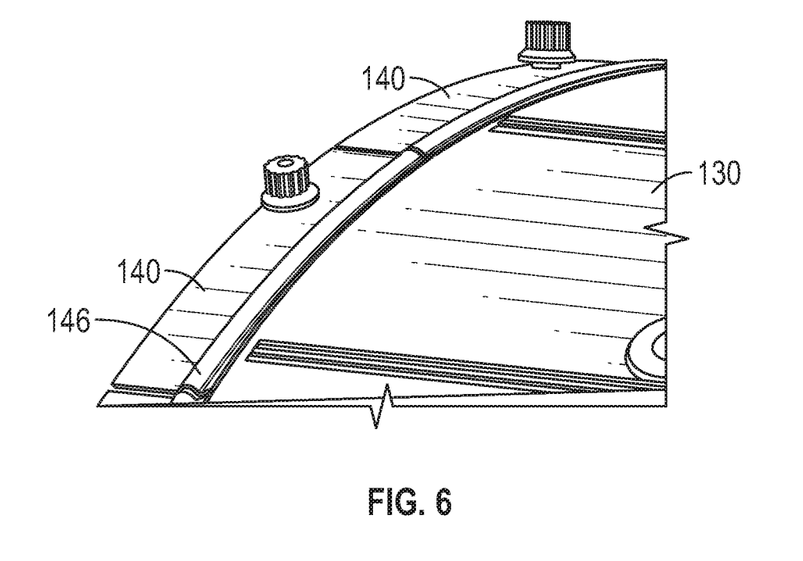
FIG. 6 is a perspective view of an end of the outer diameter panel.
Figure 7:
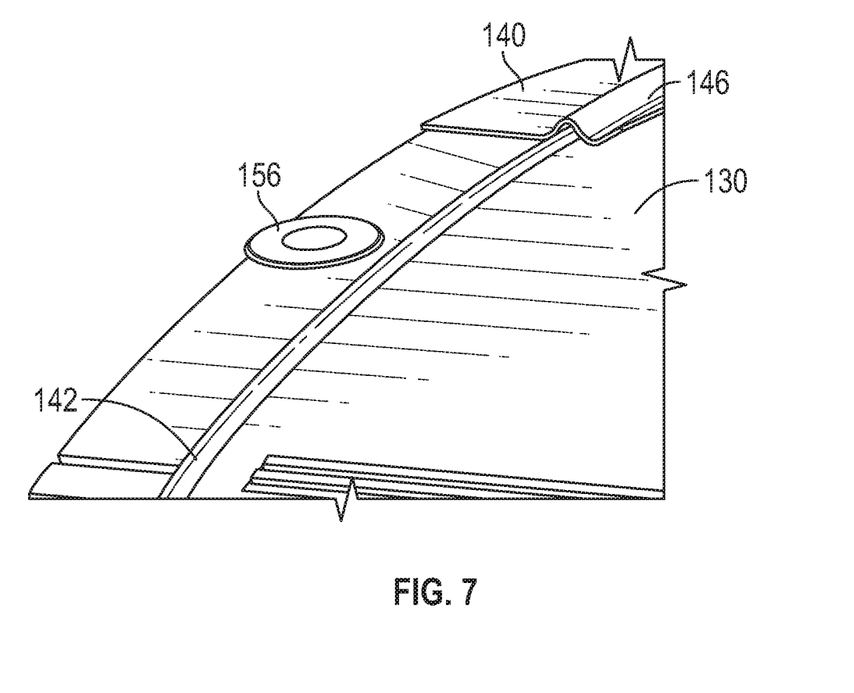
FIG. 7 is a perspective view of the end of the outer diameter panel illustrating another aspect of the disclosure.

Referring now to FIGS. 5-7, portions of a liner panel of the liner structure 130 are shown. As shown in FIG. 5, the liner panel includes an aperture 150 proximate end 152 of the liner panel that accommodates the mechanical fastener 132 shown in FIG. 6. The fastener 132 bolts the spring element 140 in place. The spring element 140 is a ship-lap panel in some embodiments to circumferentially extend around at least a portion of each liner panel. FIG. 7 illustrates a metal spacer 156 that is located on the liner panel in some embodiments. The spacer 156 takes the load of the mechanical fastener 132.

Figure 8:
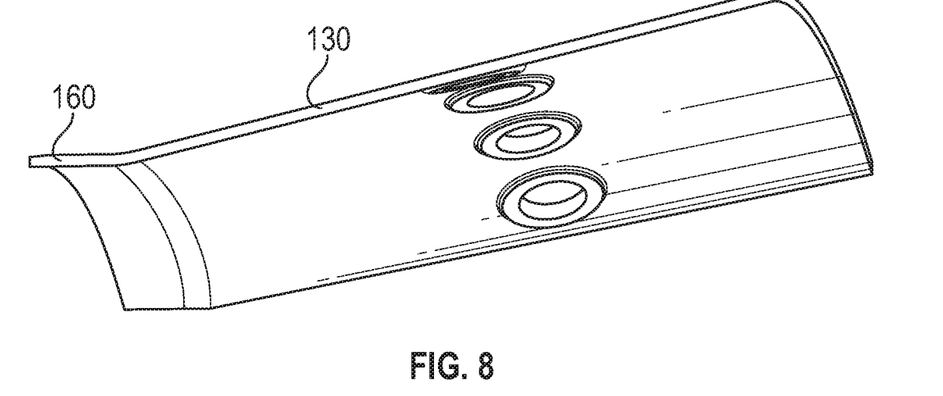
FIG. 8 is a perspective view of an inner diameter panel of the annular combustor.

FIG. 8 illustrates a liner panel of the liner structure 130 that is part of the inner diameter structure. As shown, an angled portion at an end 160 of the liner panel may be provided to accommodate the geometry of the bulkhead 120. However, it is contemplated that the bulkhead geometry may be modified in some embodiments.

The embodiments described herein avoid the problems associated with metal fastener retention or ceramic fastener retention of the liner panels. Metal fasteners require too much torque and may crack the ceramic panels, while ceramic fasteners have issues due to their brittleness and are difficult to manufacture. Additionally, a nut cannot be threaded onto ceramic fasteners. The embodiments disclosed herein utilize the spring element 140 and the protrusion feature 142 to trap the panel in the combustor assembly.

Figure 11:
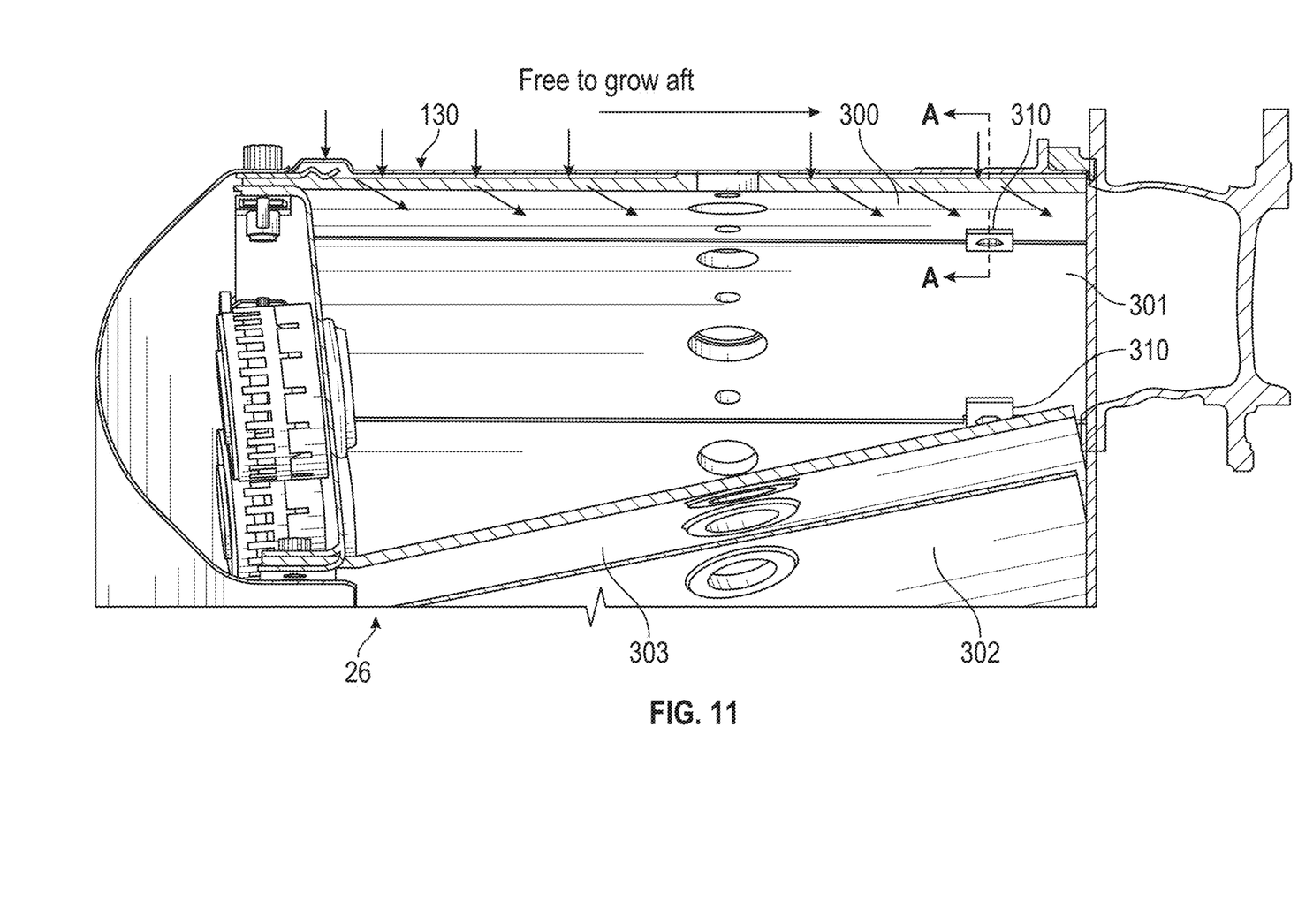
FIG. 11 is a side elevational cross-sectional view of the annular combustor according to another aspect of the disclosure.

FIG. 11, illustrates a sectional view of the bulkhead portion of the combustor section 26 showing the liner structure 130 formed of multiple liner panels. Only some of the liner panels are illustrated to show an interior of the liner structure 130. For example, liner panels 300, 301, 302 and 303 are each at least partially illustrated. The liner panels 300-303 are disposed adjacent to each other in a circumferential direction. Radial retention of the liner panels 300-303 is required, but the liner panels must also be free to grow axially during thermal growth. At least one support 310 is provided for each adjacent pair of liner panels to facilitate this.

Figure 12:
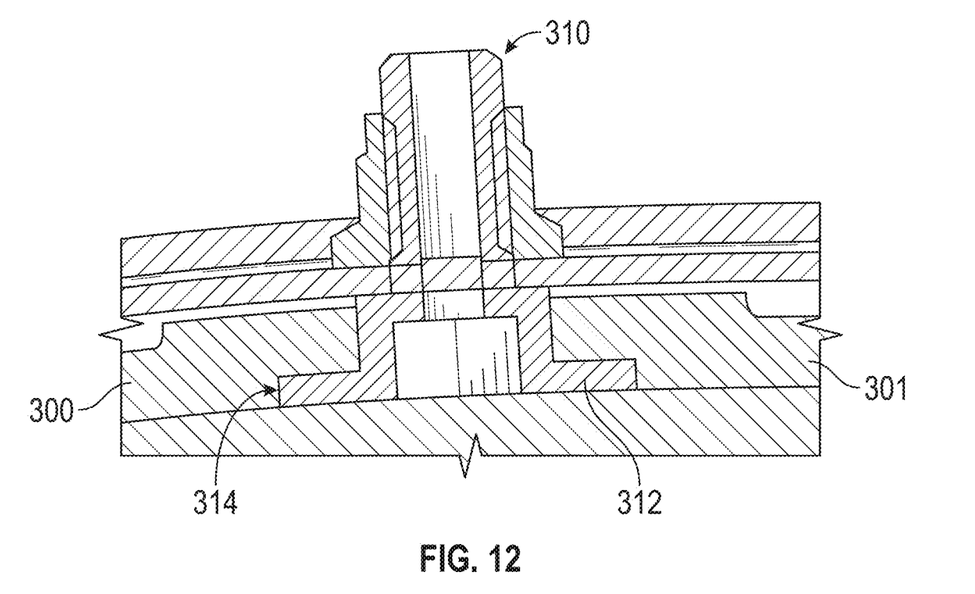
FIG. 12 is a cross-sectional view of a T-head shoulder bolt taken along line A-A of FIG. 11.
Figure 13:
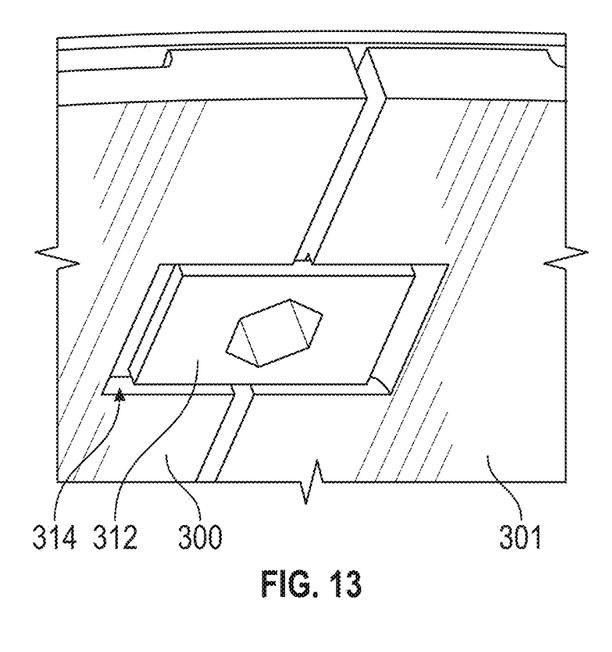
FIG. 13 is a perspective view of a portion of the T-head shoulder bolt radially retaining two adjacent combustor liner panels.

FIGS. 12 and 13 illustrate the support 310 in greater detail. In particular, the support is a T-head bolt that includes a shoulder 312 which is slightly thicker than the liner panel it is retaining. The T-head bolt retains the liner panel in the desired position, but does not clamp it down radially. The shoulder 312 is seated within a recess 314 formed by the adjacent liner panels and the mating surfaces of the shoulder 312 and the liner panels may be surface treated to reduce wear and fretting. The shoulder 312 overlaps two adjacent liner panels. By using a single T-head bolt to provide support for two, adjacent panels, the number of parts is reduced and assembly is eased.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A combustor liner panel attachment assembly comprising:
   a first liner extending from a first end to a second end, and circumferentially to partially define a combustion zone;
   the first liner and a spring element being sandwiched together;
   the first liner having a protrusion feature extending radially outward therefrom, the spring element having a recessed segment, the protrusion feature disposed within the recessed segment of the spring element to axially retain the first liner, the protrusion feature being part of the first liner;
   wherein a metal fastener extends through a portion of the first liner and through a portion of the spring element to secure the first liner and the spring element together with a metal nut threaded to the metal fastener;
   a second liner disposed circumferentially adjacent to the first liner; and
   a T-head bolt having a shoulder in contact with a radially inner surface of each of the first liner and the second liner such that the shoulder overlaps the first liner and the second liner to radially retain the first liner and the second liner, the T-head bolt allowing the first liner and the second liner to thermally grow axially.

2. The combustor liner panel attachment assembly of claim 1, wherein
   the spring element is located adjacent to a portion of the first liner and operatively coupled to a stationary structure.

3. The combustor liner panel attachment assembly of claim 2, further comprising a metal spacer disposed within an aperture of the first liner.

4. A method of assembling a combustor liner panel attachment assembly comprising:
   sandwiching a portion of a first liner and a spring element together;
   disposing a protrusion feature extending radially outwardly from the first liner within a recessed segment of the spring element to axially retain the first liner, the protrusion feature being part of the first liner;
   inserting a metal fastener through a portion of the first liner and the spring element;
   securing the first liner and the spring element together with a nut threaded to the metal fastener; and radially retaining the first liner and a second liner with a single T-head bolt having a shoulder that overlaps the first liner and the second liner.

5. The method of claim 4, wherein the shoulder of the T-head bolt is disposed in a recess defined by the first liner and the second liner.

6. The method of claim 4, wherein the spring element is operatively coupled to a bulkhead structure.

7. The method of claim 4, wherein the spring element is formed of metal.

8. The method of claim 7, wherein the spring element is a ship-lap panel.

9. The method of claim 4, wherein the portion of the first liner is formed with a non-metallic material.

10. The method of claim 9, wherein the non-metallic material is ceramic matrix composite (CMC).

11. The method of claim 4, wherein the first liner is formed of single crystal panels.

12. A gas turbine engine comprising:
a compressor section;
a combustor section;
a turbine section; and
a combustor liner panel attachment assembly comprising:
a non-metallic first liner extending from a first end to a second end, and circumferentially to partially define a combustion zone;
a spring element located adjacent to a portion of the non-metallic first liner and operatively coupled to a stationary structure, the non-metallic first liner and the spring element being sandwiched together;
the non-metallic first liner having a protrusion feature extending radially outward therefrom, the spring element having a recessed segment, the protrusion feature disposed within the recessed segment of the spring element to axially retain the non-metallic first liner, the protrusion feature being part of the non-metallic first liner;
wherein a metal fastener extends through a portion of the non-metallic first liner and through a portion of the spring element to secure the non-metallic first liner and the spring element together with a metal nut threaded to the metal fastener;
a second liner disposed circumferentially adjacent to the non-metallic first liner; and
a T-head bolt having a shoulder in contact with a radially inner surface of each of the non-metallic first liner and the second liner such that the shoulder overlaps the non-metallic first liner and the second liner to radially retain the non-metallic first liner and the second liner, the T-head bolt allowing the non-metallic first liner and the second liner to thermally grow axially.

13. The gas turbine engine of claim 12, wherein the shoulder of the T-head bolt is disposed in a recess defined by the non-metallic first liner and the second liner.

14. The gas turbine engine of claim 12, wherein the spring element is operatively coupled to a bulkhead structure.

15. The gas turbine engine of claim 12, wherein the spring element is formed of metal.

16. The gas turbine engine of claim 15, wherein the spring element is a ship-lap panel.

17. The gas turbine engine of claim 15, wherein the non-metallic first liner is formed of ceramic matrix composite (CMC).

* * * * *